United States Patent [19]

Kaiser

[11] 4,165,117
[45] Aug. 21, 1979

[54] COLLAPSIBLE CAMPING TRAILER

[75] Inventor: Jarome Kaiser, Calgary, Canada

[73] Assignee: Gabor Nadhazi, Calgary, Canada

[21] Appl. No.: 327,753

[22] Filed: Oct. 22, 1974

[51] Int. Cl.² .............................................. B60P 3/34
[52] U.S. Cl. ......................................... 296/27; 52/66
[58] Field of Search ......................... 296/26, 27, 23 C; 52/66

[56] References Cited

U.S. PATENT DOCUMENTS

| | | | |
|---|---|---|---|
| 3,352,596 | 11/1967 | Escoto | 296/27 |
| 3,362,745 | 1/1968 | Flajole | 296/27 |
| 3,463,538 | 8/1969 | Koon | 296/27 |
| 3,582,131 | 6/1971 | Brown | 296/27 |
| 3,768,855 | 10/1973 | Laue | 296/27 |

Primary Examiner—Philip Goodman
Attorney, Agent, or Firm—Shlesinger, Arkwright, Garvey & Dinsmore

[57] ABSTRACT

A multi-purpose expandable transportation apparatus convertible into a camping trailer, house trailer, truck camper or self propelled mobile home. The device is detachably mounted on an appropriate wheeled frame. Solid wall panels are hingedly connected so that in a closed position, substantial storage space is provided within the structure.

7 Claims, 13 Drawing Figures

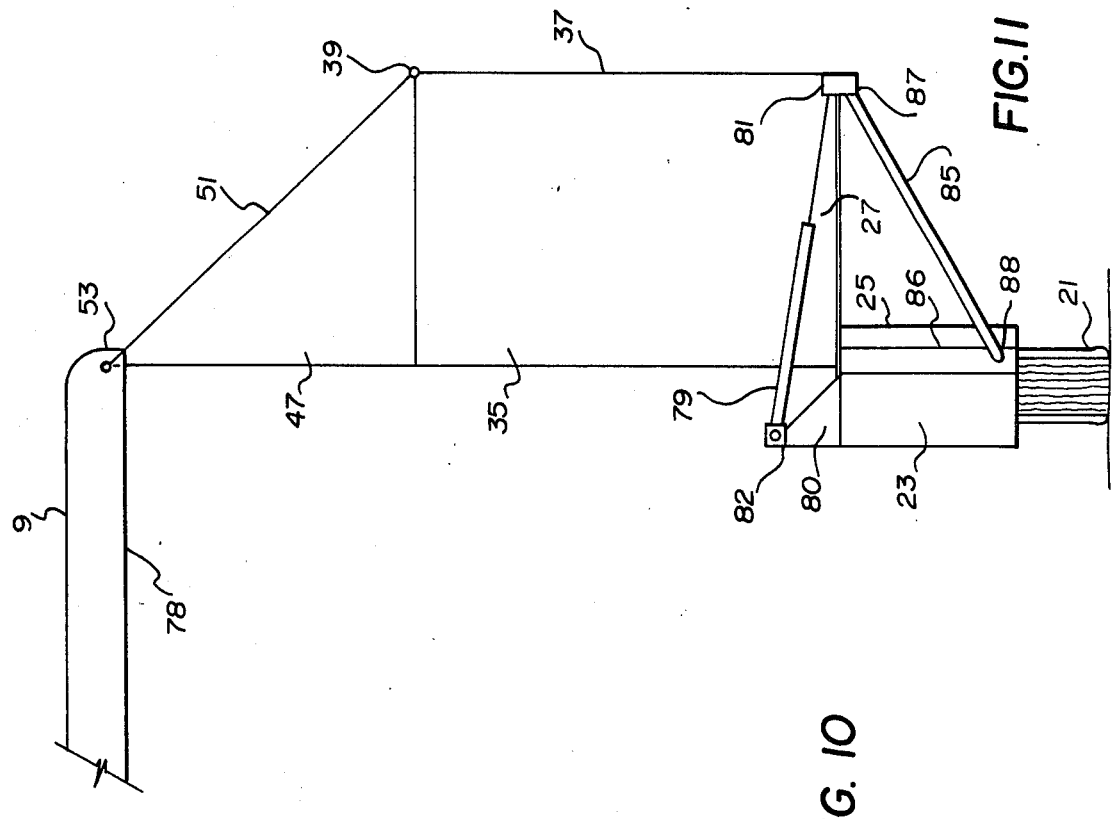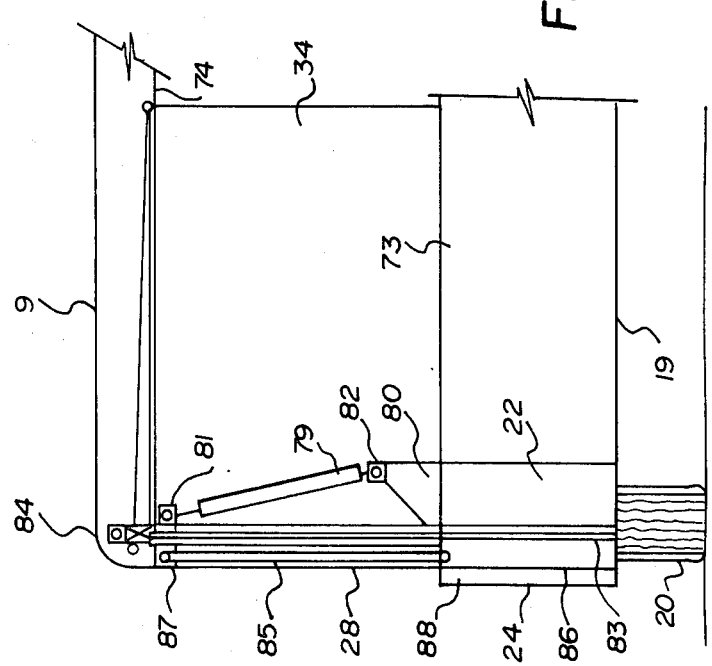

COLLAPSIBLE CAMPING TRAILER

BACKGROUND

In the prior art, many multi-purpose units are described which may be utilized for transportation and or living space. In general these prior devices comprise a single unit not detachable from the frame, and they are typically quite bulky when in a traveling position. Furthermore, these prior art devices permit only limited space to transport materials or equipment inside. Additionally, many of these devices are quite complicated or unreliable to operate in changing the device from a collapsed to an expanded condition or the reverse.

Conventional devices are adapted for either transporting of boats, snowmobiles, or all terrain vehicles, or materials and goods generally, or for camping. Living units are mounted on separate trailer frames, and persons wishing the convenience of both types of bodies have been forced to purchase two separate trailers. Moreover, in many instances in recent years, both types of vehicles are necessary for camping trips in order to take along the various recreational vehicles and or equipment on a family vacation in the summer or winter, therefore requiring two separate towing vehicles.

In transportation vehicles and portable camping units of this type, it is often desirable that the upper part, i.e. the expandable and collapsible living unit, be detachable or attachable to a trailer frame, truck box, or mobile home chassis, using the same camper unit. The size of the apparatus should be kept small when traveling to improve safety and road stability and reduce air drag. It is also desirable that the truck or self propelled chassis may be utilized separately or simultaneously with the camper unit.

It is also quite desirable that material or equipment may be carried inside the camper trailer when in the collapsed, traveling position, or directly on the trailer box, truck body or self propelled chassis with the camper unit detached.

Further, the contracting or expanding of the camper unit must have a simple mechanism, and as great and expansion capability as possible.

The camping trailer of this invention may be constructed of any appropriate width and length, and may be used as a utility trailer, a camper trailer, or mobile home trailer, or for other similar uses. In addition, the camper according to this invention, may be used to transport all types of recreational vehicles such as motorcycles, all terrain vehicles, snowmobiles, canoes, dune buggies, trail bikes, etc.

An additional feature of the present invention is that it may be utilized as a house boat by sealing the bottom portion of the camper trailer with a sealant and applying an additional cover sheet of plywood. A pressure seal is utilized at the tailgate.

The camper trailer of this invention may be opened and closed by means of a manually or mechanically operated hydraulic pump and suitable hydraulic cylinders. The various panels and sections of the camper are connected by hinges perferably of polyurethane, although other conventional hinges can be used together with a rubber or vinyl plastic strip cover for water and dust proofing.

The end panels as well as the front and back doors and the tailgate door are all edged with overlapping plastic strips which act as stoppers and with rubber welting which acts as a seal at all connecting joints in the front and back of the trailer.

DESCRIPTION OF THE DRAWINGS

FIG. 10 is a partial sectional view showing the camper-trailer expansion mechanism in the fully contracted position.

FIG. 11 is a partial sectional view showing the camper-trailer expansion mechanism in the fully expanded position.

DESCRIPTION OF THE INVENTION

Figure 1:
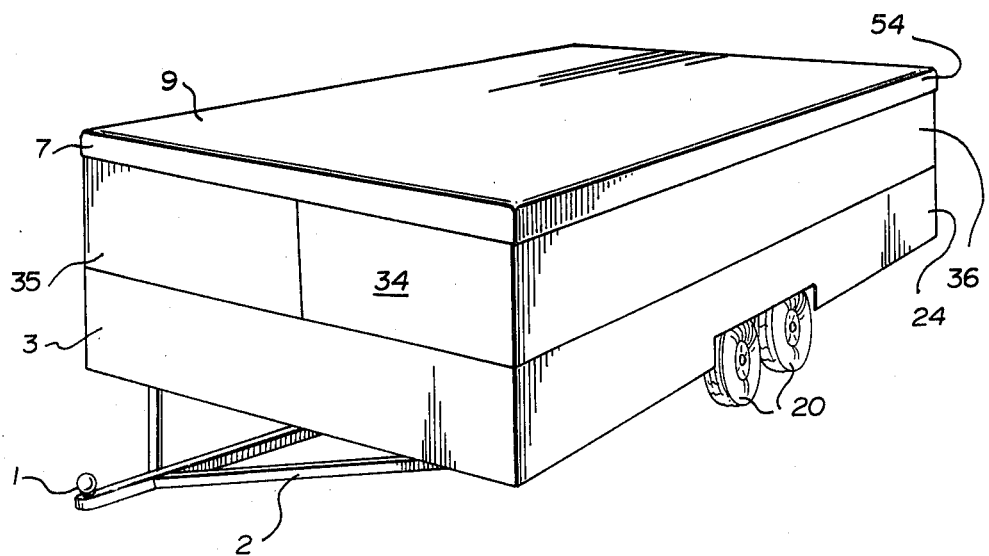
FIG. 1 is a perspective view of the camper-trailer of this invention in the fully collapsed, traveling position.

Referring to FIG. 1, the camper-trailer is seen to include a frame 2 having conventional trailer hitch 1 and suitable wheels 20. The camper body includes a roof 9 having a depending roof edge 7, 54,55. The roof edge is of such a height as to permit storage of from and back walls and side walls as will be seen. The lower portion of the camper includes a rigid front wall 3, rigid side walls 24 and 25, and a tailgate 73. Between the lower portion and the roof portion of the camper-trailer are units having front and rear walls 34 and 35, and side walls 36 and 37. The side walls 36 and 37 are hingedly connected along their length to walls 24 and 25 by suitable piano hinges 26 and 27.

Figure 2:
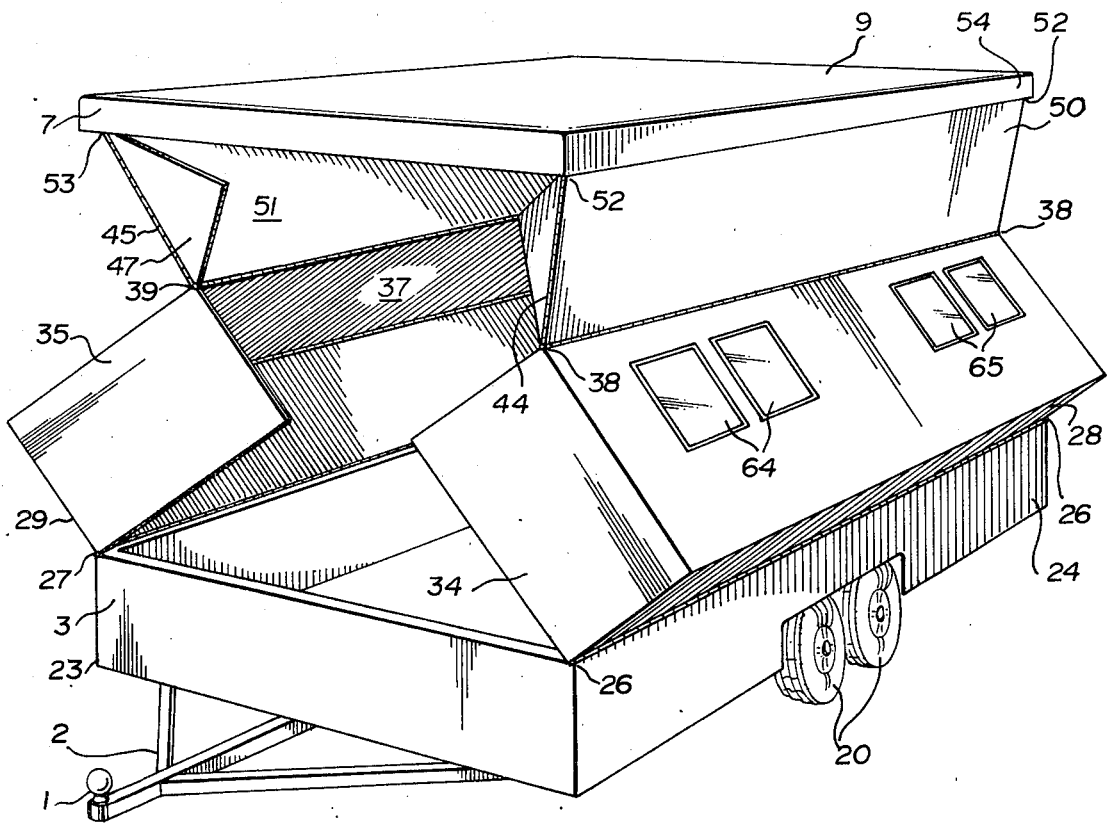
FIG. 2 is a perspective view of the camper-trailer partially expanded.

Referring to FIG. 2, the camper-trailer is shown in a partially expanded state, side walls 36 and 37 are shown rigidly connected to end walls 34 and 35 and panels 28 and 29. At the upper edge of walls 36 and 37 are piano hinges 38 and 39 which hingedly connect walls 36 and 37 with walls 50 and 51 along their length. Walls 50 and 51 are similarly connected to the roof 9 by means of piano hinges 52 and 53.

Figure 3:
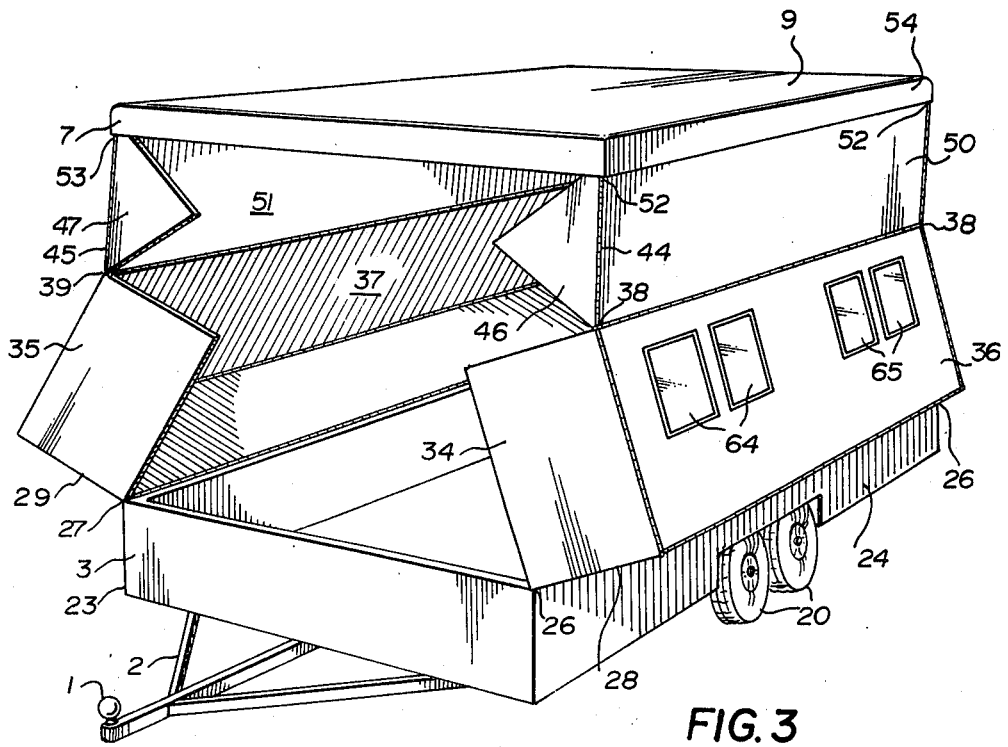
FIG. 3 is a perspective view showing the camper-trailer expanded to the point where the three piano hinges on each side are vertically aligned.
Figure 4:
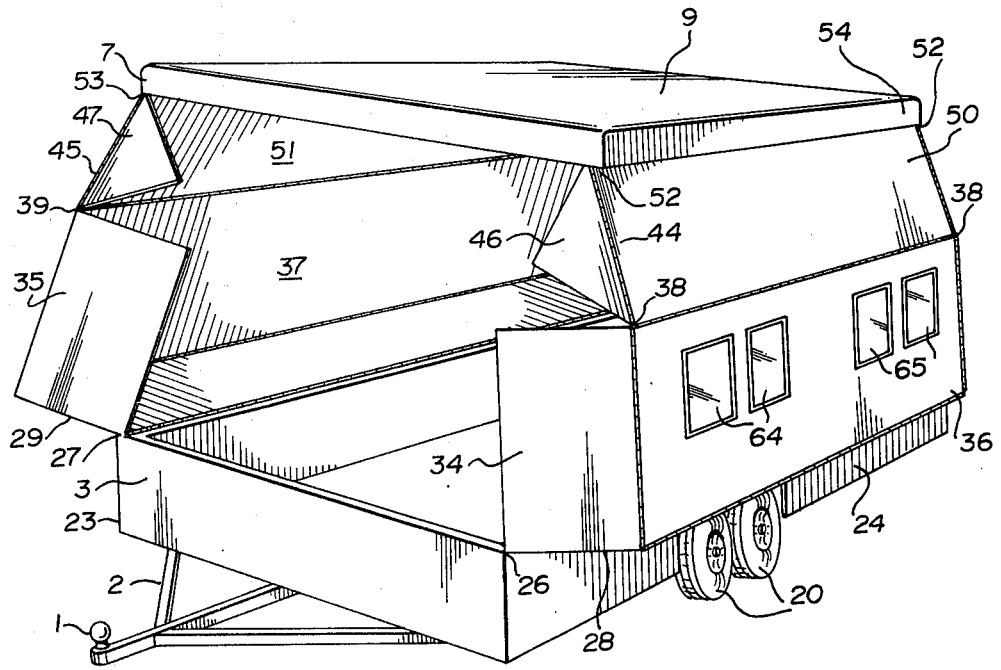
FIG. 4 is a perspective view showing the camper-trailer at a point just prior to complete expansion.
Figure 5:
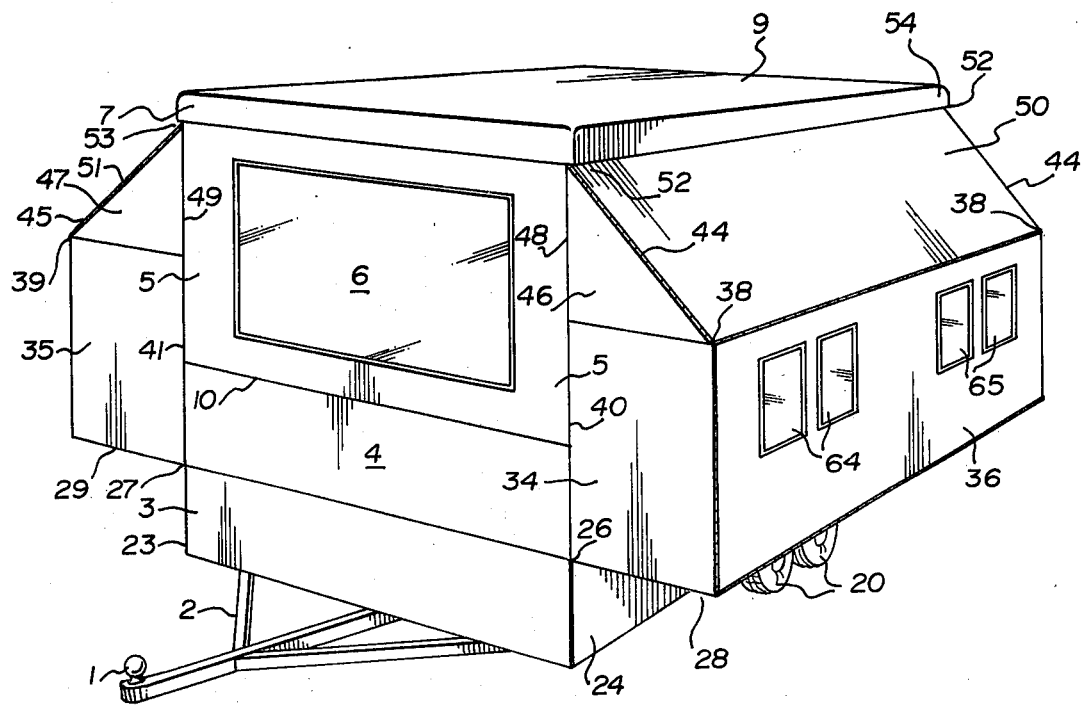
FIG. 5 is a perspective view of the camper-trailer in its fully expanded position, with the front picture window in place.
Figure 6:
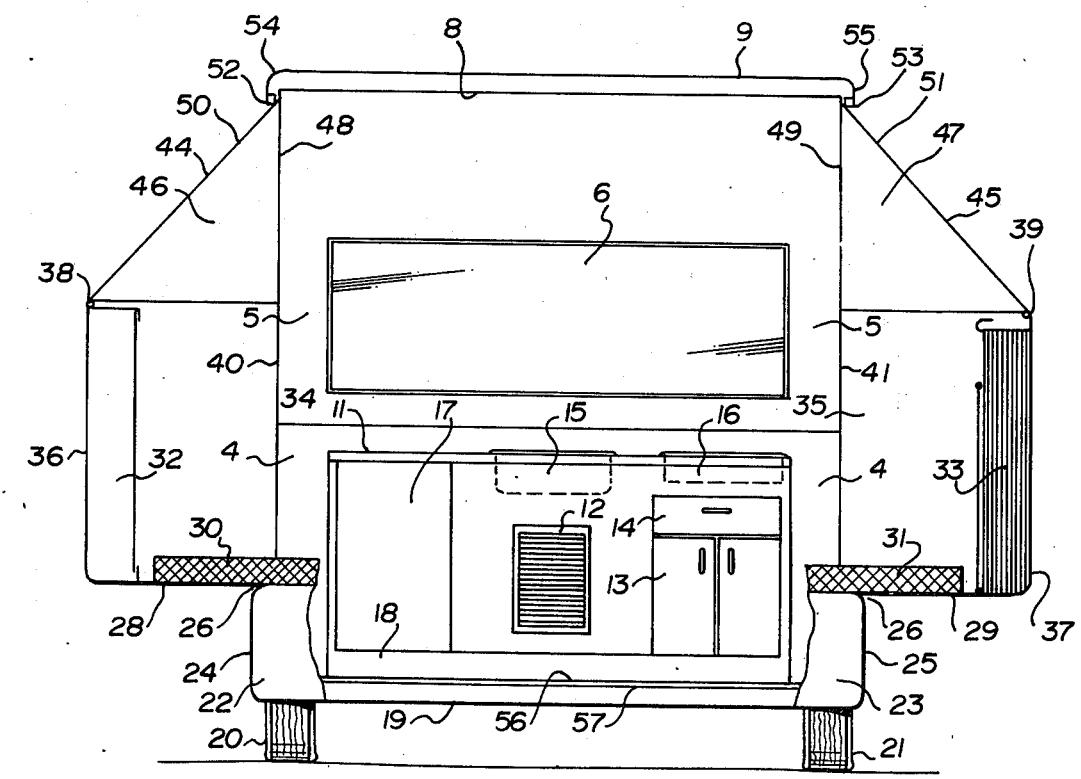
FIG. 6 is a front elevation of the camper-trailer in the fully expanded position with portions removed for clarity.
Figure 7:
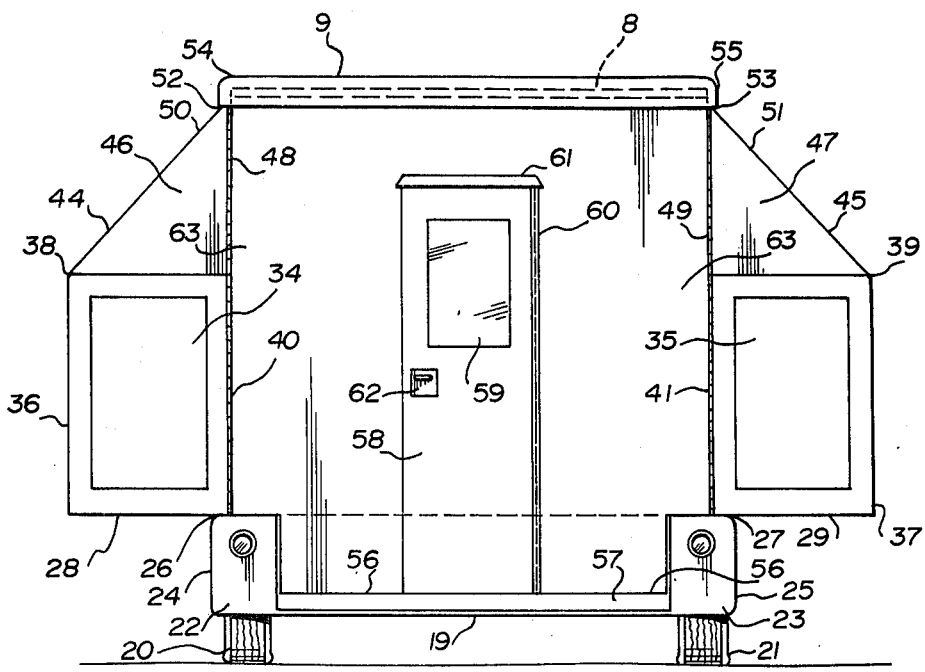
FIG. 7 is a rear elevation view of the camper-trailer in its fully expanded position.

As seen in FIGS. 2-6, walls or panels 50 and 51 have at each end thereof triangular end panels 46 and 47 hinged thereto by means of piano hinges 44 and 45. These triangular panels 46 and 47 are initially folded flat against the insides of walls 50 and 51 as shown in FIG. 2, and during the opening of the camper the panels unfold as seen in FIGS. 3 and 4 until the camper is opened completely when the triangular panel are positioned as shown in FIGS. 5 and 6. The camper additionally includes a front wall 5 having a picture window 6 which is connected by means of a piano hinge 8 to the roof 9. Front wall 5 also is stored within the top 9 when the camper is in the closed position, and when opened, joins panel 4 by means of a suitable joint 10. Similarly at the rear, a rear wall 63 having a door 58 is provided. Door 58 includes a hinge 60, a window 59, a drip shield 61, and a suitable doorknob 62. The rear also includes a hinged tailgate 56 and tailgate riser 67.

Of course the trailer is provided with a suitable floor 19 to complete the structure.

Figure 8:
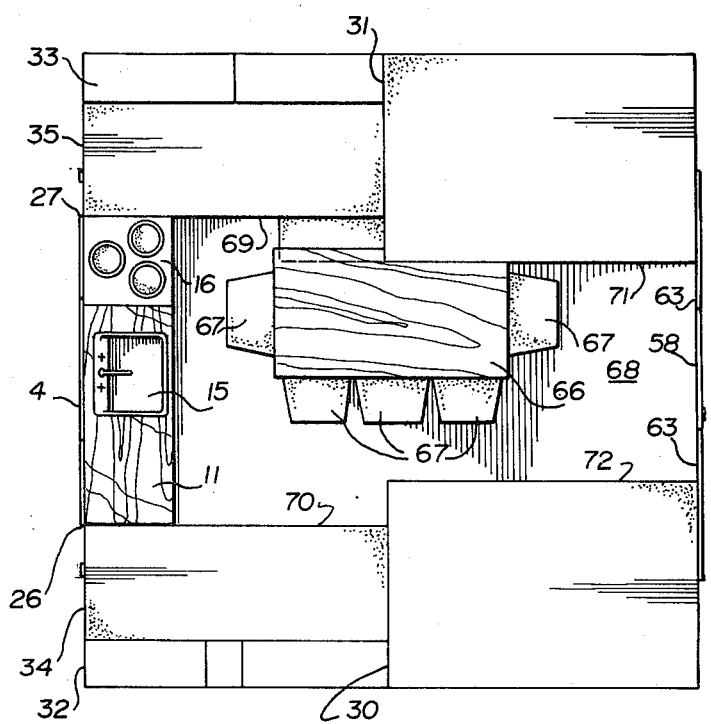
FIG. 8 is a floor plan of the fully expanded camper-trailer.

Within the trailer, appropriate furnishings are provided including a kitchen couter top 11, heater 12, kitchen cupboard 13, drawer 14, sink 15, range 16, refrigerator 17, bunks 30, 31, 69 and 70, cupboards and closets 32, 33, table 66, and chairs 67. These may be positioned as shown in FIGS. 6 and 8.

The mechanism for opening the camper trailer is best seen in FIGS. 10 and 11. A suitable locking device (not shown) unlocks the roof and releases four spring loaded lifting devices located at the corners of the camper which lift the roof upwardly to a point at which the roof 9, the sloped side walls 50, 51, and the vertical side walls 36, 37 are in an equiangular relationship with respect to each other. The spring starter 83 is best seen in FIG. 10. Additionally, a brace 85 slides in a channel 86 and is pivoted at 87 to the panels 28 and 29. At this point, hydraulic cylinders 79 mounted on brackets 80 by means of pivots 82 and which are also secured to panels 28 and 29 by pivots 81, are actuated to push outwardly at the pivots 81 thereby moving walls 36, 37, 50 and 51 to the fully open position.

Figure 9:
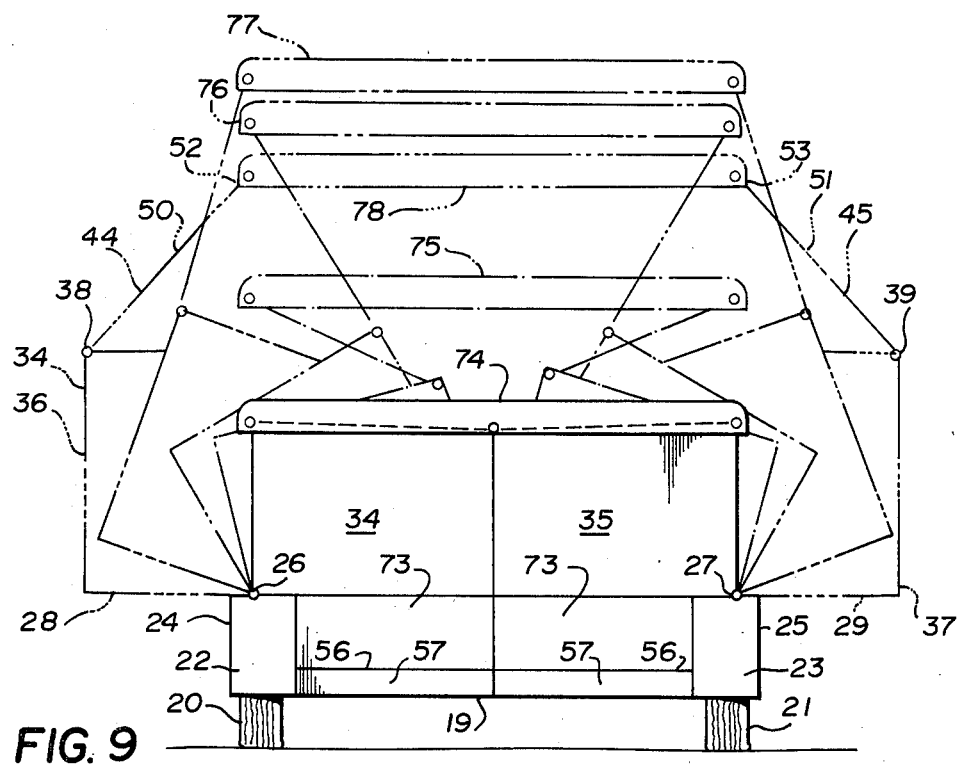
FIG. 9 is a schematic view showing the expansion process of the camper-trailer.
Figure 12:
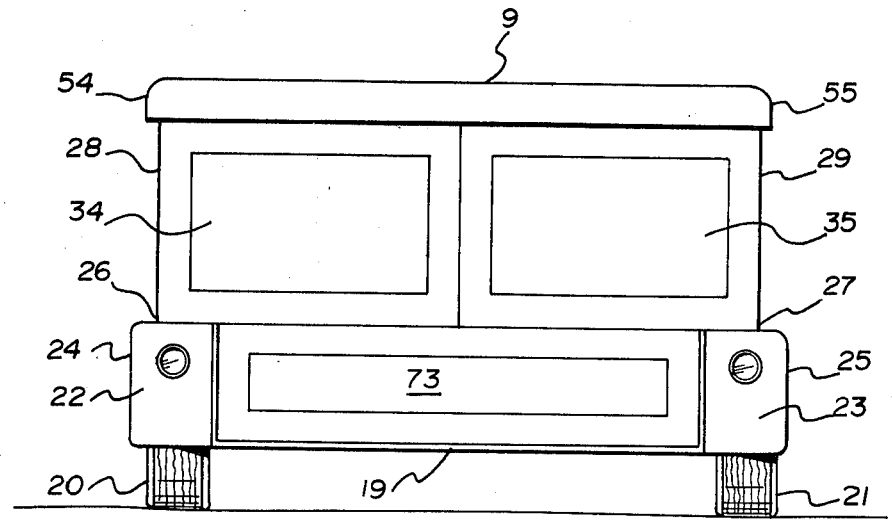
FIG. 12 is a rear elevation view of the camper-trailer in the fully contracted, traveling position.
Figure 13:
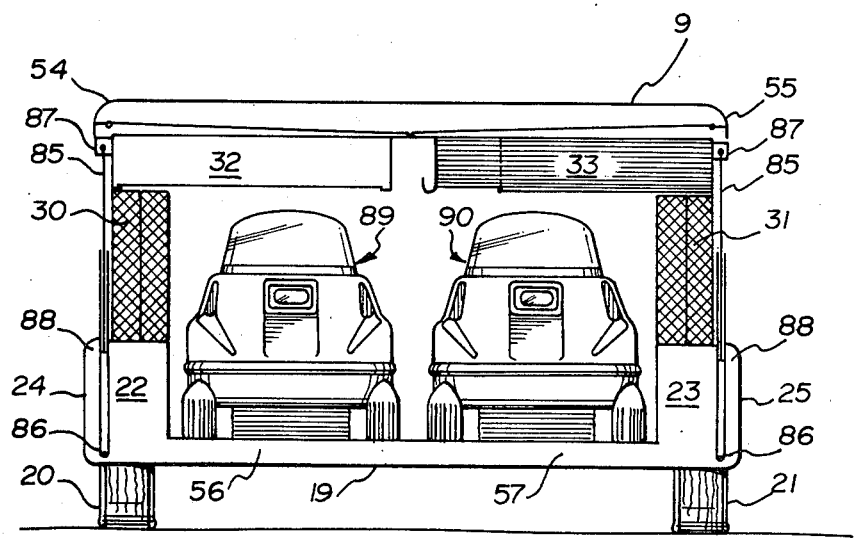
FIG. 13 is a cross-sectional view from the rear of the camper-trailer illustrated two snowmobiles loaded therein.

With reference to FIG. 9, the camper roof 9 is illustrated in its collapsed traveling position by 74, a starting position by 75, a further upward position 76, its highest point 77, and the fully expanded position 78 where the roof has lowered slightly from its highest point due to the nature of the expansion operation. Upon reaching the fully open position, braces 85 have automatically dropped to the position shown in FIG. 11 to support the side extensions. During this expansion operation the four triangular end panel walls 46 and 47 fall into a vertical position. At this point, the end walls 3, 4, 5, and 63 may be lowered into position.

To collapse the camper from the expanded camping position, a suitable manual or hydraulic device which collapses the front and back walls toward each other into the sealing under the roof is actuated. The hydraulic cylinder 79 are then actuated which pull the side walls inwardly toward each other, which again pushes the roof 9 upwardly to its highest point and then pulls the side walls inwardly toward each other. The roof then continues downwardly until the camper is completely closed, at which point the roof may be locked by any suitable lock or latch.

There has been illustrated and described what is considered to be a preferred embodiment of the invention. It will be understood, however, that various modifications may be made by persons skilled in the art without departing from the scope of the invention which is defined by the appended claims.

I claim:

1. A collapsible camping trailer body for a wheeled trailer frame comprising:

(a) a lower box portion including a floor, two upstanding side walls, and two upstanding end walls, said walls being rigidly connected to said floor,
   (b) outer wall members hingedly connected to the top edges of each of said side walls along substantially the entire length thereof,
   (c) each of said outer wall members comprising a first panel joining the side wall at the hinge connection, a second panel fixed at substantially a right angle to said first panel, a pair of end panels rigidly secured to said first and second panels at the ends thereof and at right angles to each of said first and second panels, and a third panel hingedly connected to the upper longitudinal edge of said second panel,
   (d) a roof member of substantially the same length and width dimensions as said lower box portion said roof member including a substantially planar panel serving as the outer roof of said camping trailer both in expanded and collapsed positions,
   (e) the upper edge of said third panel being hingedly connected to said roof member along said edge,
   (f) triangular filler panels hingedly connected to each of the end edges of said third panels,
   (g) said outer wall members forming extension rooms wherein said first panel comprises the bottom, said second panel comprises a wall, and said third panel comprises a sloping roof, and said end panels and filler panels comprise front and rear walls of said extension rooms when opened,
   (h) front and rear trailer end walls hingedly connected to said roof member,
   (i) jack means for raising and lowering said roof member and thereby opening or collapsing said extension rooms and whereby said roof may be raised from a first, closed position to a second fully elevated position when said extension rooms are partially opened to a third partially elevated position when said extension rooms are fully opened,
   (j) said first panels forming vertical side walls, said second panels and third panels being in face-to-face juxtaposition and said end panels forming front and rear walls when said trailer is collapsed,
   (k) said front and rear trailer end walls being in face-to-face juxtaposition with said roof when said trailer is collapsed.

2. A collapsible camping trailer as in claim 1 and wherein said rear trailer end wall includes a door frame and a door.

3. A collapsible camping trailer as in claim 2 and wherein said front trailer end wall includes a picture window.

4. A collapsible camping trailer as in claim 3 and wherein said second panels include windows.

5. A collapsible camping trailer as in claim 1 and wherein said jack means includes fluid operated jacks.

6. A collapsible camping trailer as in claim 1 and including support means extending from said lower box portion for supporting said extension rooms.

7. A collapsible camping trailer as in claim 5 and wherein said jack means further includes a spring loaded lifting mechanism for partially raising said roof and extending said extension rooms to a point at which said fluid operated jacks are operable to complete the extension of said extension rooms to a fully open position.

* * * * *